United States Patent Office 2,723,292
Patented Nov. 8, 1955

2,723,292

DECOLORIZATION OF AMINO-ACID CONTAINING MIXTURES

Albert J. Schlaeger and Edwin A. Radecki, Toledo, Ohio, assignors to International Minerals & Chemical Corporation, a corporation of New York No Drawing. Application January 12, 1952,
Serial No. 266,246

12 Claims. (Cl. 260—534)

This invention relates to a process for the treatment of amino acid-containing mixtures. More particularly, it relates to the decolorization of amino acid-containing mixtures such as proteinaceous hydrolysates, Steffen's filtrates and Steffen's filtrate hydrolysates.

In the past proteinaceous hydrolysates and concentrated Steffen's filtrate have been decolorized with carbonaceous materials. These amino acid-containing mixtures are complex and contain organic compounds, such as amino acids, as well as nonorganic acids, salts and other compounds. Generally, these mixtures are decolorized by adding carbon to the mixture and allowing it to stand for about 5 to 30 minutes at between about 50° C. and about 80° C. while stirring. The decolorizing carbon is then separated from the mixture.

It is an object of the present invention to provide an improved process for the decolorization of amino acid-containing mixtures.

It is a further object of the instant invention to provide an improved process for the decolorization of proteinaceous hydrolysates and of Steffen's filtrates and their hydrolysates.

It is a further object of the instant invention to provide a simple and rapid method for the decolorization of amino acid-containing mixtures.

These and other objects of the instant invention are realized by contacting metallic substances, which have an activity greater than hydrogen in the electromotive series, with the amino acid-containing mixture.

In practicing the instant invention, a metallic substance, which has an activity greater than hydrogen in the electromotive series, is added to the amino acid-containing mixture, and the resulting mixture is allowed to stand for between about ½ minute and about 60 minutes. The decolorizing agent is then separated from the mixture, for example by filtration.

Any metallic substances having an activity greater than hydrogen in the electromotive series may be employed as the decolorizing agent in the instant process. The decolorizing agent is preferably in a finely divided state in order that there is maximum surface area for any given weight of metal. Although zinc dust is the preferred decolorizing agent, other finely divided metals such as magnesium, iron, aluminum, zinc (powder) and tin or combinations thereof may be employed as the decolorizing agent.

Any amino acid-containing mixture may be decolorized by the instant novel process. Raw materials such as sulfuric acid- or hydrochloric acid-hydrolyzed proteinaceous compositions, such as corn gluten hydrolysates or wheat gluten hydrolysates, may be decolorized by the instant process. The efficiency of zinc dust, for example, as the decolorizing agent is illustrated by the fact that treatment of sulfuric acid-hydrolyzed wheat gluten with 4 grams of zinc dust (1.21% of the gluten raw material) for a period of about 3 minutes at atmospheric temperature and at atmospheric pressure caused the same degree of color removal which is ordinarily obtained by treating this same quantity of raw material with 65 to 100 grams of decolorizing carbon for about 30 minutes at about 75° C.

The instant process may be employed to decolorize any amino acid-containing mixture which has a pH between about 1 and about 10. However, the mixture preferably has a pH of, or is adjusted to a pH of, between about 4 and about 8. The metallic decolorizing agent is added to the amino acid-containing mixture in amounts between about 0.1% and about 40%, the amount added depending upon the particular mixture to be decolorized and the particular metal employed. For example, in order to decolorize a wheat gluten hydrolysate with zinc dust, between about 0.2% and about 1.5% by weight, based on the gluten raw material, is the preferred amount of zinc dust. Decolorization begins almost immediately. The metal is allowed to stand in contact with the gluten hydrolysate for between about ½ minute and about 60 minutes, preferably between about 3 and about 15 minutes at atmospheric temperature and atmospheric pressure. Although the decolorization will occur at any temperature between about 10° C. and about 140° C. atmospheric temperature and atmospheric pressure are preferred. If desired, however, superatmospheric pressures are employed.

The conditions of temperature, time and pH employed for the decolorization should be correlated in order to minimize or eliminate conversion of any glutamic acid present in the amino acid mixture to pyrrolidone carboxylic acid. The rate of conversion of glutamic acid to pyrrolidone carboxylic acid is more rapid at lower pH's, such as between about 3.0 and about 4.0, than at pH's of about 7 at which pH the conversion is very slow. The conversion to pyrrolidone carboxylic acid is also more rapid at higher temperatures such as between about 100° C. and about 140° C.; at about atmospheric temperature the conversion to pyrrolidone carboxylic acid is negligible even for mixtures having a pH of between about 3 and about 4 and even though the time of contact of the decolorizing agent and the mixture is as long as about 60 minutes. However, when an amino acid mixture is decolorized at a pH at which conversion to pyrrolidone carboxylic acid is rapid, such as between about 3.0 and about 4.0, the time of contact with the decolorizing agent should be of minimum duration while maintaining temperatures below about 100° C.

If the contact time is less than about 15 minutes, conversion to pyrrolidone carboxylic acid is not substantial even though temperatures between about 100° C. and about 140° C. are employed and even though the pH of the mixture is between about 3 and about 4. If the pH is between about 3 and about 4, a longer contact time, for example, between about 15 minutes and about 60 minutes may be employed if the temperature is maintained below about 100° C.

The preferred contact time is between about 3 minutes and about 15 minutes. If a contact time within this range is employed, temperatures between about 10° C. and about 140° C. and pH's between about 1 and about 10 may be employed. When the pH of the amino acid mixture is about 7.0 as in the preferred practice of the invention the period of contact with the decolorizing agent may be between about ½ minute and about 60 minutes and a temperature between about 10° C. and about 140° C. may be employed.

In a preferred embodiment of the instant invention, between about 0.24 gram and about 7 grams of zinc dust is agitated in about 100 grams of wheat gluten which has been hydrolyzed with sulfuric acid. The pH of the mixture is between about 4 and about 8. Maximum color reduction occurs within between about 3 minutes and about 15 minutes. Longer periods of standing in the presence of the zinc dust does not appreciably increase the degree of color removal. The undissolved zinc is separated from the decolorized solution, for example by filtration, and may be reused for decolorization. That fraction of zinc which dissolves in the decolorized mixture can be removed by any conventional method for the precipitation of zinc from solutions. Treatment of the solution with hydrogen sulfide to precipitate the zinc quantitatively as zinc sulfide is preferred.

The following example is presented in order to afford a clearer understanding of the practice of the instant invention, but it is distinctly understood that this example is illustrative only and there is no intention to limit the invention thereto.

*Example*

To about 1,100 mls. of sulfuric acid-hydrolyzed corn gluten, from which the humin has been removed by filtration, while at a pH of about 4.3, there was added about 4 grams of zinc dust which analyzed approximately as follows: total zinc, 92.3%; zinc oxide, 34.6%; free zinc, 64.5%. The mixture was stirred gently for about 3 minutes at atmospheric temperature and pressure. The dark brown color of the original mixture was reduced in intensity to a pale straw color. The undissolved zinc (3.2 grams) was removed from the decolorized mixture by filtration. The 0.8 grams of zinc dust which dissolved was removed by treating the solution with hydrogen sulfide at about 22° C. Zinc sulfide precipitated and was separated by filtration. The cloudy yellow filtrate was heated at about 45° C. for about 5 minutes and then filtered. The resulting filtrate was a pale straw color.

Having thus fully described and illustrated the character of the instant invention, what is desired to be protected and secured by Letters Patent is:

1. The method for the decolorization of crude amino acid-containing mixtures comprising contacting an amino acid-containing mixture, having a pH of between about 1 and about 10, with a metallic decolorizing composition selected from the group consisting of metals having an activity greater than hydrogen in the electromotive series and a combination of these metals, said metallic decolorizing composition being the sole decolorizing agent added to the mixture for between about ½ minute and about 60 minutes and correlating conditions in order to minimize pyrrolidone carboxylic acid formation.

2. The method for the decolorization of crude amino acid-containing mixtures comprising contacting said amino acid-containing mixture having a pH of between about 4 and about 8 with a metallic decolorizing composition selected from the group consisting of metals having an activity greater than hydrogen in the electromotive series and a combination of these metals, said metallic decolorizing composition being the sole decolorizing agent added to the mixture for between about 3 minutes and about 30 minutes.

3. The process of claim 2 wherein the decolorizing agent is zinc dust.

4. The process of claim 2 wherein the decolorizing agent is finely divided iron.

5. The method for the decolorization of crude amino acid-containing mixtures comprising contacting said amino acid-containing mixture having a pH of between about 1 and about 10 with a metallic decolorizing composition selected from the group consisting of metals having an activity greater than hydrogen in the electromotive series and a combination of these metals, said metallic decolorizing composition being the sole decolorizing agent added to the mixture in an amount of between about 0.1% and about 40% by weight of the amino acid-containing raw material for between about ½ minute and about 30 minutes, and separating the decolorizing metal therefrom.

6. The method for the decolorization of crude amino acid-containing mixtures comprising adding to a protein hydrolysate having a pH of between about 1 and about 10 between about 0.1% and about 40% by weight of the original proteinaceous material of a metallic decolorizing composition selected from the group consisting of metals having an activity greater than hydrogen in the electromotive series, and a combination of these metals, said metallic decolorizing composition being the sole decolorizing agent added to the mixture allowing the resulting mixture to stand for at least about 3 minutes at atmospheric temperature and at atmospheric pressure, and separating the decolorizing agent therefrom.

7. The method for the decolorization of crude amino acid-containing mixtures comprising contacting said amino acid-containing mixture, having a pH of between about 4 and about 8, with between about 0.1% and about 40% by weight of the amino acid raw material of a metallic decolorizing composition selected from the group consisting of metals having an activity greater than hydrogen in the electromotive series, and a combination of these metals, said metallic decolorizing composition being the sole decolorizing agent added to the mixture for between about 3 minutes and about 60 minutes at atmospheric pressure and at atmospheric temperature, and separating the decolorizing agent therefrom.

8. The method for the decolorization of crude amino acid-containing mixtures comprising adding to said amino acid-containing mixture, having a pH of between about 4 and about 8, zinc dust decolorizing agent in the amount of between about 0.2% and about 1.5% by weight of the amino acid-containing raw material, allowing the resulting mixture to stand for between about 3 minutes and about 15 minutes, and separating the decolorizing material from the decolorized mixture.

9. The method for the decolorization of crude amino acid-containing mixtures comprising contacting said mixture with a metallic decolorizing composition selected from the group consisting of metals having an activity greater than hydrogen in the electromotive series and a combination of these metals, said metallic decolorizing composition being the sole decolorizing agent added to the mixture at a pH of between about 1 and about 10 for between about ½ minute and about 60 minutes at a temperature of between about 10° C. and about 140° C. and correlating the conditions in order to minimize pyrrolidone carboxylic acid formation.

10. The method for the decolorization of crude protein hydrolysates comprising contacting the protein hydrolysate having a pH of between about 1 and about 10 with a metallic decolorizing composition selected from the group consisting of metals having an activity greater than hydrogen in the electromotive series and a combination of these metals, said metallic decolorizing composition being the sole decolorizing agent added to the mixture in the amount of between about 0.1% and about 40% by weight of the protein raw material, allowing the resulting mixture to stand for between about 3 minutes and about 60 minutes at a temperature between about 10° C. and about 140° C., separating the decolorizing agent therefrom, and correlating the conditions in order to minimize pyrrolidone carboxylic acid formation.

11. The method for the decolorization of crude protein hydrolysates comprising contacting the protein hydrolysate having a pH of between about 4 and about 8 with a metallic decolorizing composition selected from the group consisting of metals having an activity greater than hydrogen in the electromotive series and a combination of these metals, said metallic decolorizing composition being the sole decolorizing agent added to the mixture in the amount of between about 0.1% and about 40% by weight of the protein raw material, allowing the resulting mixture to stand for between about 3 minutes and about 60 minutes at a temperature between about 10° C. and about 140° C., separating the decolorizing agent therefrom, and correlating the conditions in order to minimize pyrrolidone carboxylic acid formation.

12. The method of claim 11 wherein the decolorizing agent is zinc dust.

References Cited in the file of this patent

UNITED STATES PATENTS

| | | |
|---|---|---|
| 103,141 | Clarke | May 17, 1870 |
| 634,462 | Hyatt | Oct. 10, 1899 |
| 710,413 | Besson | Oct. 7, 1902 |
| 1,944,170 | Darlington | Jan. 23, 1934 |
| 2,305,657 | Aehnelt | Dec. 22, 1942 |

OTHER REFERENCES

Zuew et al.: Chem. Ab., vol 2, page 1195 (1908).